United States Patent
Lagasi

(10) Patent No.: US 12,405,489 B2
(45) Date of Patent: Sep. 2, 2025

(54) METHOD FOR DECORATING AN OPHTHALMIC ARTICLE AND RELATED OPHTHALMIC ARTICLE

(71) Applicant: BARBERINI S.P.A., Silvi (IT)

(72) Inventor: Matteo Lagasi, Parma (IT)

(73) Assignee: BARBERINI S.P.A., Silvi (IT)

(*) Notice: Subject to any disclaimer, the term of this patent is extended or adjusted under 35 U.S.C. 154(b) by 431 days.

(21) Appl. No.: 18/017,461

(22) PCT Filed: Jul. 15, 2021

(86) PCT No.: PCT/EP2021/069817
§ 371 (c)(1),
(2) Date: Jan. 23, 2023

(87) PCT Pub. No.: WO2022/017918
PCT Pub. Date: Jan. 27, 2022

(65) Prior Publication Data
US 2023/0273462 A1 Aug. 31, 2023

(30) Foreign Application Priority Data
Jul. 23, 2020 (EP) .................... 20187350

(51) Int. Cl.
*G02C 11/02* (2006.01)
*G02C 7/10* (2006.01)
*G02C 7/12* (2006.01)

(52) U.S. Cl.
CPC .............. *G02C 11/02* (2013.01); *G02C 7/107* (2013.01); *G02C 7/12* (2013.01)

(58) Field of Classification Search
CPC .......... G02C 11/02; G02C 7/107; G02C 7/12; G02C 7/10; G02C 7/104; G02C 7/021; B29C 64/386; B33Y 80/00
(Continued)

(56) References Cited

U.S. PATENT DOCUMENTS 11,067,828 B2 * 7/2021 Pine ................ B29D 11/00317
11,347,078 B2 * 5/2022 Maurice ................ G02B 1/111
(Continued)

FOREIGN PATENT DOCUMENTS

EP 2682808 A1 1/2014
EP 2816378 A1 12/2014
(Continued)

OTHER PUBLICATIONS

Office Action issued Mar. 19, 2025 in European Patent Application No. 21748541.6, 7 pages.
(Continued)

*Primary Examiner* — Tuyen Tra
(74) *Attorney, Agent, or Firm* — Element IP, PLC

(57) ABSTRACT

The invention relates to a method for decorating an ophthalmic article. The method contains a step of providing an ophthalmic article having a substrate with a first outer surface intended to be oriented towards the field of view of a user. The first outer surface has at least one decoration zone outside the central vision zone of the ophthalmic article and has topographic structures of at least one dimension of length greater than or equal to 1 mm for forming a decorative pattern. The method further contains a step of depositing thin layers on the first outer surface to form an interferometric mirror on top of the first outer surface. The thin layers have a refractive index different from the refractive index of the substrate.

14 Claims, 8 Drawing Sheets

Figure 1:
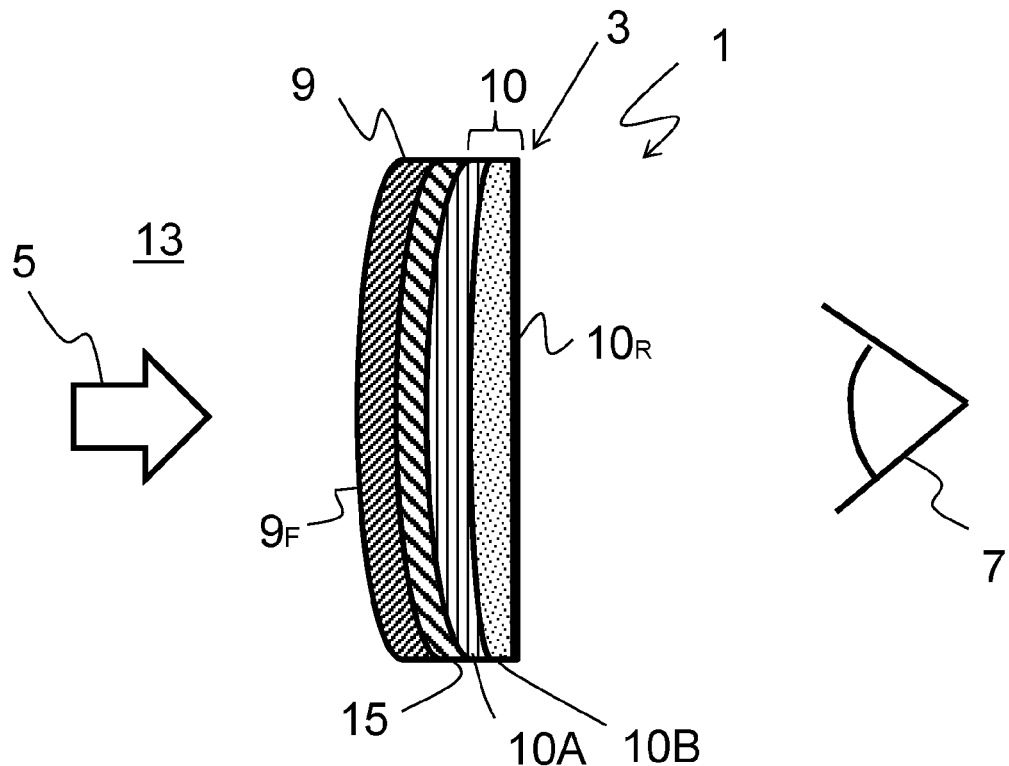

(58) Field of Classification Search
USPC .................................................. 351/41, 51
See application file for complete search history.

(56) References Cited

U.S. PATENT DOCUMENTS

| | | | |
|---|---|---|---|
| 11,940,595 B2 * | 3/2024 | Ookubo | ................. B24B 13/00 |
| 2004/0240067 A1 | 12/2004 | Marusi et al. | |
| 2020/0108466 A1 | 4/2020 | Dubois et al. | |
| 2020/0166775 A1 | 5/2020 | Ookubo | |

FOREIGN PATENT DOCUMENTS

| | | |
|---|---|---|
| EP | 2878989 A1 | 6/2015 |
| EP | 3385067 A2 | 10/2018 |
| GB | 897634 A | 5/1962 |
| WO | WO-2020078964 A1 | 4/2020 |

OTHER PUBLICATIONS

International Search Report and Written Opinion issued Oct. 15, 2021 in PCT/EP2021/069817, 12 pages.
Jason Lassere, "PAL Markings to noticeable?", www.visionvalet.com—Vision Valet, XP055846199, Sep. 13, 2019, 3 pages.

* cited by examiner

METHOD FOR DECORATING AN OPHTHALMIC ARTICLE AND RELATED OPHTHALMIC ARTICLE

The present invention relates to a method for decorating at least partially an ophthalmic article and a related ophthalmic article.

The term "ophthalmic article" is specifically understood to mean a lens, corrective or otherwise, that can be used as spectacle glass, for spectacles for example, particularly sunglasses, goggles, visors or the like.

Eye- or sunglasses do not only have medical functions, in particular to protect the eye, to ease vision or to correct the vision of the wearer, but they are also used as "fashion item" and personalization is an important topic in this context.

Concerning the spectacle frames generally made of a plastic material or in part of metal, many decoration techniques are known and used for personalization and for transformation of the spectacle lenses into a fashion object.

However, concerning the lenses, decoration effects are much more limited and there are fewer techniques for decoration at hand, in particular techniques which are easy to implement, offer a wide range of decoration possibilities and at limited supplemental cost.

Today, decoration of the lenses often consists in applying for example an interference filter on the lenses to get a mirror effect or in tinting uniformly, or with a gradient, a substrate of the lens in adding a dye or specific pigments in the substrate material.

With these techniques, it's difficult to get some "fancy" fashion effects.

The present invention therefore aims to propose a method for decorating an ophthalmic article that offers a large spectrum of possibilities at contained cost and manufacture facilities on an industrial level.

With this aim, the invention proposes a method for decorating an ophthalmic article comprising the following steps of:
- providing an ophthalmic article having a substrate with a first outer surface intended to be oriented towards the field of view of a user and presenting at least one decoration zone outside the central vision zone of the ophthalmic article and having in said at least one decoration zone topographic structures of at least one dimension of length greater or equal to 1 mm on the first outer surface for forming a decorative pattern,
- depositing on said first outer surface thin layers having a refractive index different from the refractive index of the substrate to form an interferometric mirror on top of the first outer surface wherein the topographic structures have a height/depth variation profile with respect to the mean first outer surface which is greater than a total thickness of the interferometric mirror.

It is thus possible to obtain surface decoration allowing a variety of decorative effects, in particular geometric pattern, which may be repetitive.

With regard to prior art, a structure with an interferometric mirror does not provide discomfort to a wearer. In addition, using topographic structures having a height/depth variation profile with respect to the mean first outer surface which is greater than a total thickness of the interferometric mirror allows enhancing the decoration effect.

The general concept behind the decoration method is that the topographic structures can be considered as "voluntary surface defects" created on the ophthalmic article. When depositing on said first outer surface thin layers having a refractive index different from the refractive index of the substrate to form an interferometric mirror on top of the first outer surface, such "voluntary surface defects" due to the topographic structures propagate through the deposited thin layers and will modify the optical transfer function of the interferometric mirror. The topographic structure is replicated by the thin layers and results an interferometric decorative pattern in the decoration zone.

As even small voluntary defects will finally imply "defects" in the interferometric mirror structure and its optical transfer function, quite very elaborated and complex pattern can be realized. Due to light refraction of incident light, one might observe even color changes in the decoration zone in function of the observation angle. Such an effect is in particular impossible to get with the teachings of prior art like for example in EP 2 682 808.

One may therefore understand that quite very fancy decorative effects can be realized through the above decoration method.

In an example, the decoration zone is distant of at least 15 mm from the position of the eye corresponding to a mid-pupillary eye position of the user when the ophthalmic article is mounted in eyeglasses which are then worn by the user.

The decoration method may comprise one or several of the following aspects taken alone or in combination.

According to one aspect, the topographic structures comprise ribs and/or grooves, in particular with a width comprised in a range of 10-400 µm, more specifically between 50-200 µm.

The topographic structures may comprise at least one geometric form out of the following group: straight lines, curved lines, pyramids, needles.

The topographic structures have for example a height/depth variation profile with respect to the mean first outer surface which is greater than a total thickness of the interferometric mirror.

The topographic structures may have height/depth variation profile with respect to the mean first outer surface which is greater than 20 µm and less than 200 µm, in particular less than 100 µm.

The topographic structures comprise for example at least one periodic pattern.

Providing an ophthalmic article comprises in particular a step of injection molding the ophthalmic article in a mold, where the mold part configured to form the first outer surface comprises in negative the topographic structures forming a decorative pattern appearing positive on the first outer surface.

According to a further aspect, the mold part may be configured to form the first outer surface comprises an interchangeable mold insert presenting in negative the topographic structures forming a decorative pattern appearing positive on the first outer surface.

Providing an ophthalmic article may comprise alternatively or in addition a step of engraving topographic structures.

Providing an ophthalmic article may comprise alternatively or in addition a step of depositing a rib through 3-D printing on the front face of a polished ophthalmic article.

Providing an ophthalmic article may comprise alternatively or in addition a step in depositing on the front face of a polished ophthalmic article a heated metal wire or grid in the decoration zone.

After depositing on the front face of a polished ophthalmic article a heated metal wire or grid in the decoration zone, the heated metal wire may be withdrawn.

The thin layers forming the interferometric mirror are for example deposited by PVD or CVD.

The interferometric mirror comprises for example between two and six thin layers.

The ophthalmic article may further comprise a polarizing layer.

The invention is also related to an ophthalmic article manufactured according a method as defined above.

The ophthalmic article may comprise a polarization layer.

The injection molded ophthalmic article further comprises in particular a layer of tinted plastic material.

The invention also relates to sunglasses comprising an ophthalmic article as defined above, where the decoration zone is located outside the central vision zone of the ophthalmic article, in particular above the central vision zone of the user.

Figure 2:
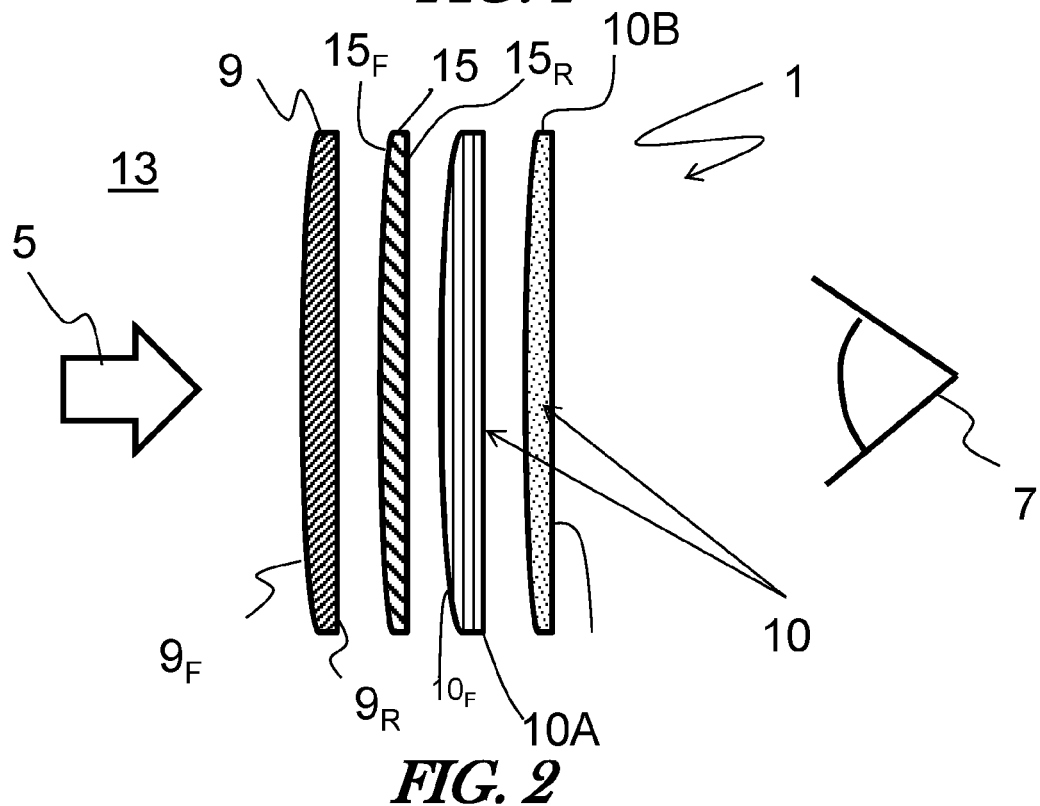
Figure 3:
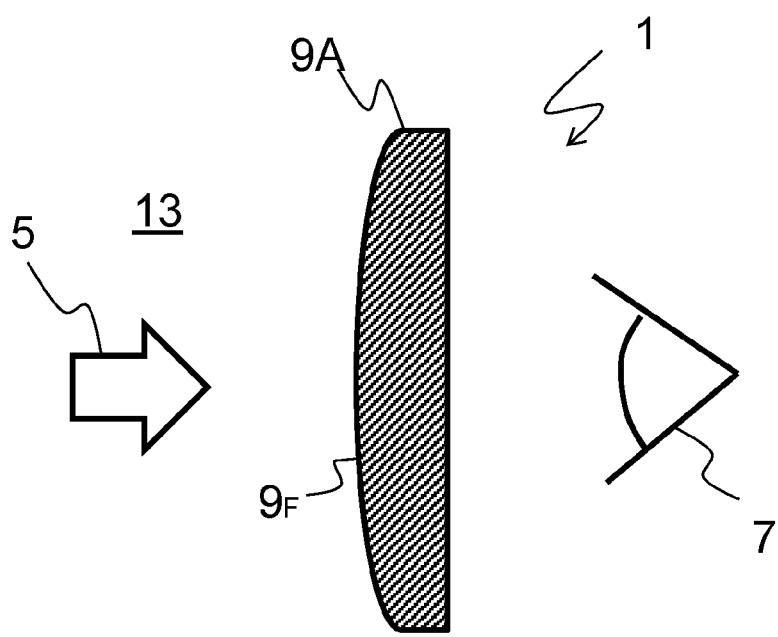
Figure 4:
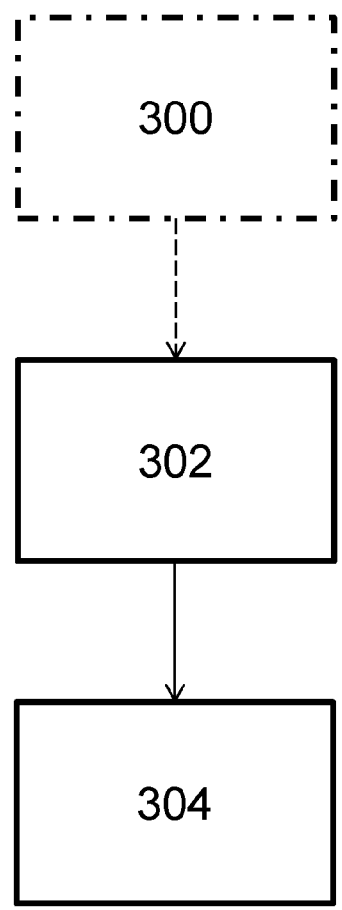
Figure 5:
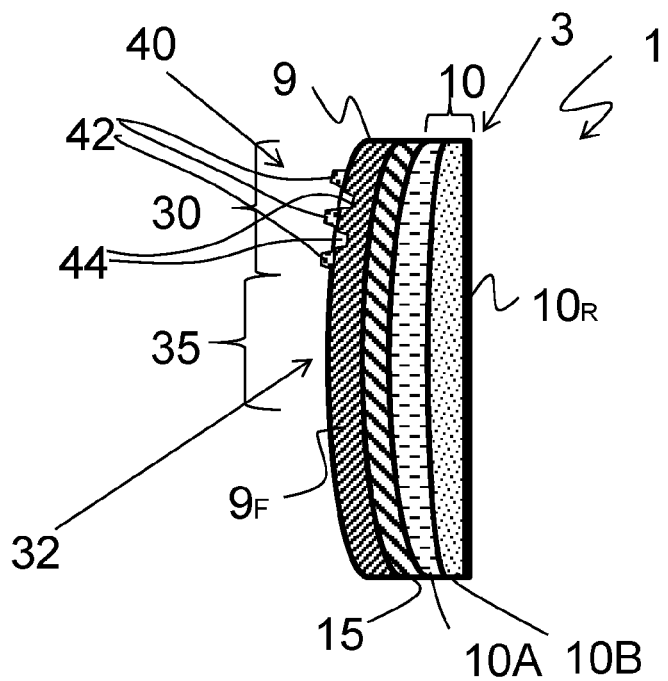
Figures 1, 5:
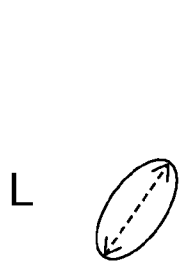
Figures 2, 5:
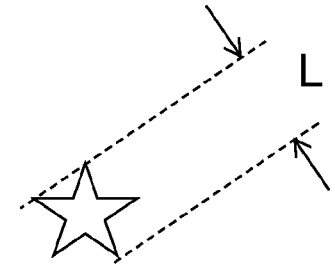
Figures 3, 5:
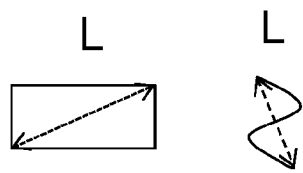
Figures 4, 5:
Figure 5:
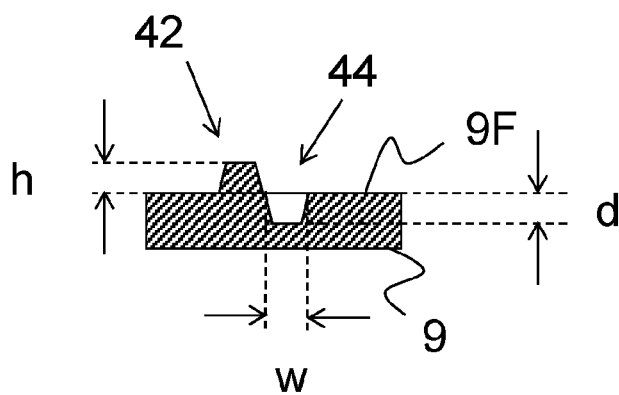
Figure 6:
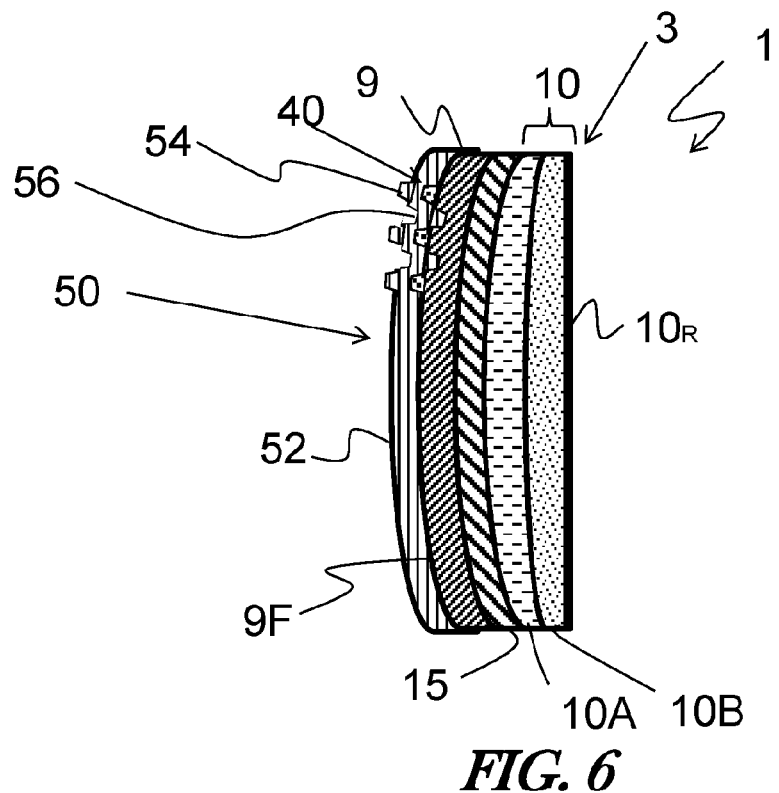
Figure 7:
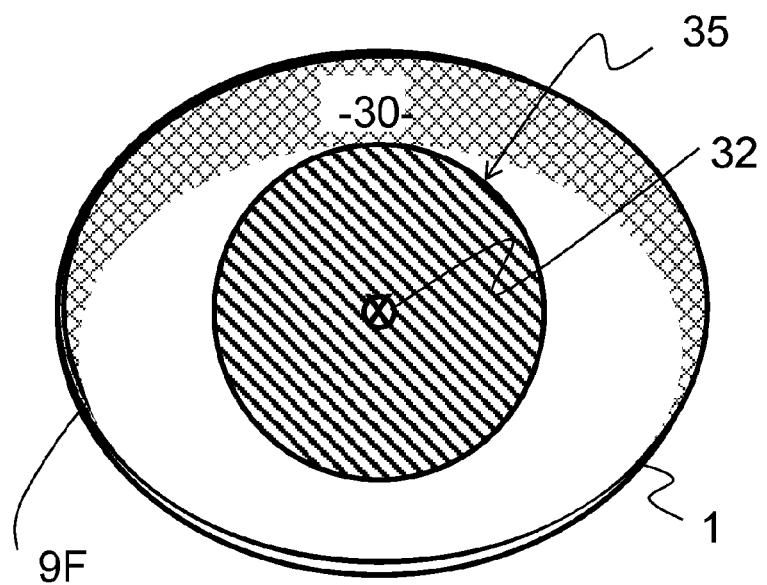
Figure 8:
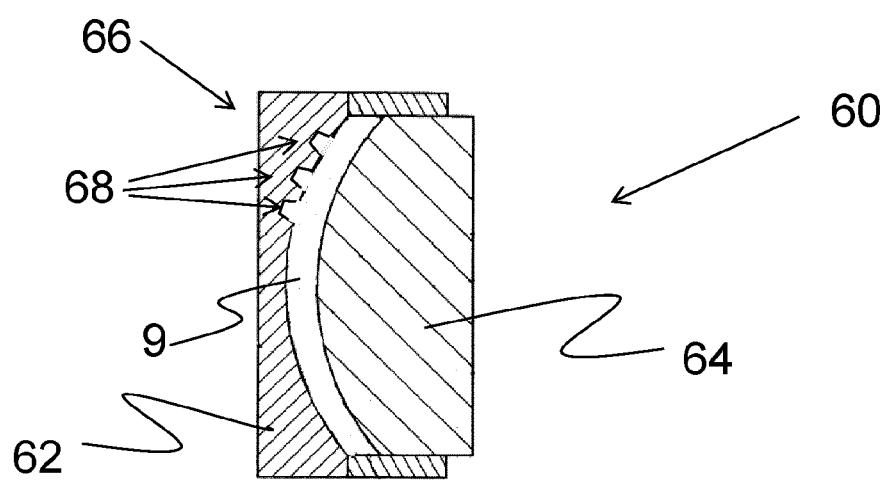
Figure 9:
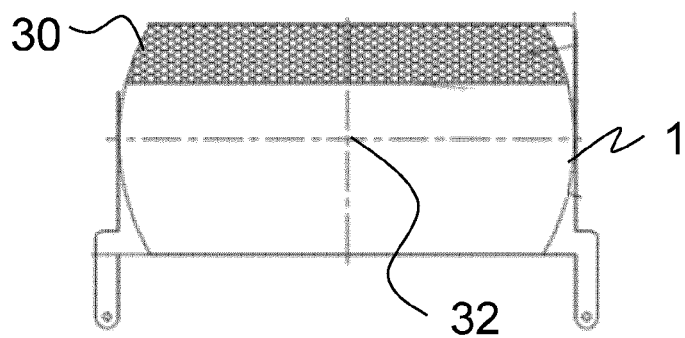
Figure 10:
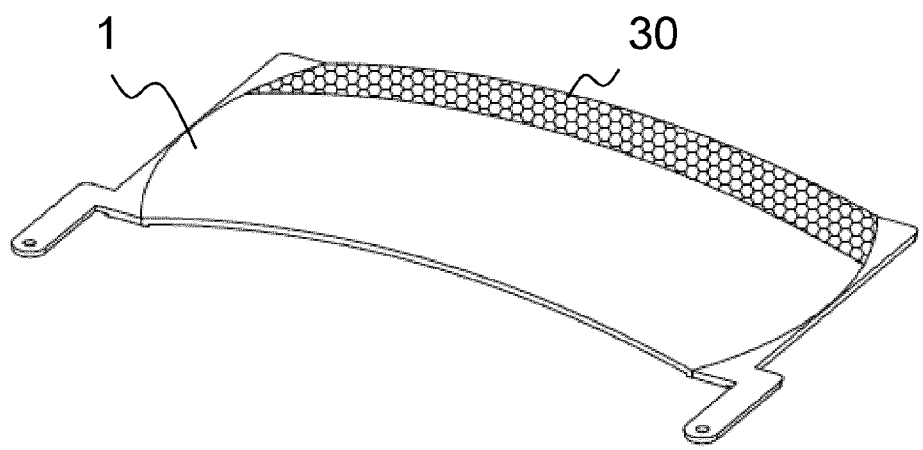
Figure 11:
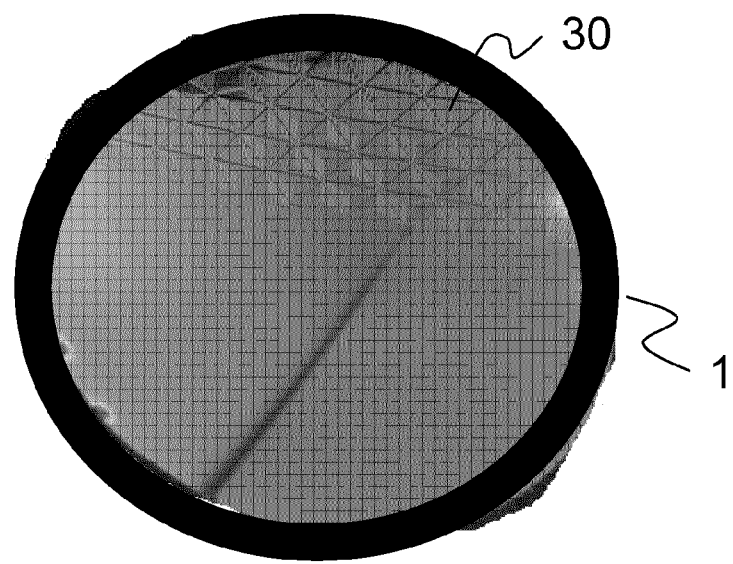

Other advantages and features will become apparent upon reading the description of the following figures, among which:

FIG. 1 shows an example of a schematic cross section view of an ophthalmic article intended to be decorated, FIG. 2 is an exploded view of the layers of FIG. 1, FIG. 3 shows another example of a schematic cross section view of an ophthalmic article intended to be decorated, FIG. 4 shows an example of a flow-chart of the method for decorating at least partially an ophthalmic article, FIG. 5 shows an example of a schematic cross section view of an ophthalmic article intended to be decorated after a certain process step, FIGS. 5-1, 5-2, 5-3 and 5-4 show examples of topographic structures and their length dimension, FIG. 5-5 shows a view in cross section of a detail of FIG. 5, FIG. 6 shows an example of a schematic cross section view of an ophthalmic article intended to be decorated after another process step, FIG. 7 shows an example of a top view of the ophthalmic article after another process step, FIG. 8 shows an example of a cross section of a mold for providing an ophthalmic article with topographic structures, FIGS. 9 and 10 show an example of a decorated ophthalmic article obtained with the described method, and FIG. 11 shows a further example of a decorated ophthalmic article obtained with the described method.

A "topographic structure" in the present description can be considered as a three dimensional pattern with respect to an optically polished surface of the ophthalmic article.

On all the figures, the same elements bear the same reference numbers.

The following embodiments are only examples. Although the description refers to one or several embodiments, the invention is not limited to theses embodiments. In addition, a feature described in relationship with one embodiment may also concern another embodiment even if this is not mentioned expressively. Simple features of different embodiments may also be combined to provide further realizations.

In the present description, by "front" or "back" face of a layer, reference is made to the propagation of the rays of light towards the eye through the ophthalmic lens when an ophthalmic device bearing the ophthalmic lens is worn on a wearer's face. Thus a "front" face is always that which is closest directed toward the user's field of view and a "rear" face is always that which is closest to the eye of the user.

By "upstream" or "downstream" of two elements or layers, one refers to the propagation of the rays of light towards the eye in the same system as presented above. Thus, a first element is disposed upstream of a second element when the light passes through its path towards the eye of the user first through the first element and then through the second element. Conversely, a first element is disposed "downstream" of a second element when the light passes through its path towards the eye of the user first through the second element and then through the first element.

The terms "crystal" or "crystal glass" are understood to mean a glass/optical material of the class 0 according to the standardized international definition of glasses into five categories of light transmission. It is a glass having in the visible spectrum a light transmission range comprised between 80% and 100%.

The ophthalmic article 1 as shown in the figures is for example intended to be used for spectacles, in particular sunglasses. To do this, it is only necessary to shape the outer edge 3 according to the desired shape of the frame of the eyeglasses or sunglasses. Alternatively, and within the scope of the disclosure, the ophthalmic article may be intended for goggles, vision visors or the like.

In FIGS. 1 and 2, the light incident on the ophthalmic article 1 and an eye 7 representing a user are shown by the arrow 5. The field of view 13 is thus situated on the side of the arrow 5 and the user looks through the ophthalmic article 1 with his eye 7.

By ophthalmic article 1 is meant a corrective lens or not (piano-lens), finished or semi-finished, suitable for being mounted in a frame, for example a spectacle frame, goggles, a mask or a visor intended to be placed in front of the eyes and forming a screen of visual protection.

The ophthalmic article 1 comprises at least one layer or substrate (see for example FIG. 3).

As to the example shown in FIGS. 1 and 2, an ophthalmic article 1 intended to be decorated has a first layer 9 (front layer) and a second layer 10 (rear layer). One or several third layer(s) 15 may be sandwiched between the first layer 9 and the second layer 10.

At this stage the ophthalmic article 1 which has not been submitted to deposition of thin layers forming an interferometric mirror, can be considered as a lens blank element.

In this context, treatments conferring additional functions, either alone or in combination among the following non-exhaustive list: shockproof, anti-scratch, anti-abrasion, anti-reflective on the surface of the lens opposite the one intended to be decorated, anti-fouling, anti-fogging, anti-static are not considered as additional layers. These additional functions can be carried out according to conventional methods (soaking, vacuum deposition, spin coating, spray coating, etc.).

Several of these treatments may be applied before, others after deposition of thin layers forming an interferometric mirror, either on the front or on the back of the ophthalmic article 1.

The first layer 9 is for example made of a plastic material, thermoset or thermoplastic plastic material, in particular made of polyamide (PA), like nylon or a polycarbonate.

The first layer has a rear face 9R to be oriented toward the eye 7 of the user and a front face 9F to be oriented toward the field of vision 13 of the user. The first layer 9 has a for example a thickness comprised between 0.05 mm and 1 mm and even 5 mm, preferentially comprised between 0.1 mm and 0.8 mm, preferentially between 0.15 mm and 0.5 mm, for example 0.18 mm.

In particular the front face 9F shall be decorated via the method outset in this application.

The second layer 10 is for example also made of a plastic material, thermoset or thermoplastic plastic material, in particular made of polyamide (PA), like nylon or a polycarbonate.

The second layer 10 has a rear face 10R to be oriented toward the eye 7 of a user and a front face 10F to be oriented toward the field of vision 13 of the user. The second layer 10 has for example a thickness comprised between 0.05 mm and 1 mm or even 6 mm, preferentially comprised between 0.05 mm and 0.8 mm, preferentially between 0.1 mm and 0.5 mm, for example 0.15 mm. In that case, the ophthalmic article may be an optical film, dedicated to be applied onto or into a lens. Alternatively the second layer 10 has for example a thickness comprised between 0.5 mm and 5 mm, preferentially comprised between 1 mm and 4 mm, most preferably between 1.4 mm and 4 mm or even between 1.5 mm and 3 mm. In that case, the ophthalmic article may be an ophthalmic lens.

However, other thicknesses for layers 9 and 10 can be chosen in function for example of the optical correction of the ophthalmic article 1. In particular, if an optical correction is desired, one of the layers 9 and 10 may have a non-uniform thickness, so that its front face has a different curvature than its rear face.

As can be seen in FIGS. 1 and 2, the first layer 9 is disposed proximate to the field of vision 13 of the user with regard to the second layer 10 that is disposed proximate to the eye 7 of the user.

Optional third layer 15 is for example made of a polarizing layer, in particular linearly polarizing polyvinyl alcohol which is disposed between the first layer 9 and the second layer 10. The third layer 15 may have a thickness comprised between 0.01 mm and 1 mm preferentially comprised between 0.02 mm and 0.2 mm, for example 0.05 mm or 0.07 mm.

The third layer 15 has a rear face 15R to be oriented toward the eye 7 of a user and a front face 15F to be oriented toward the field of vision 13 of the user.

When assembled, for example through thermoforming or injection molding, the rear face 9R of the first layer 9 is in contact with the front face 15F of the third layer 15 and the rear face 15R of the third layer 15 is in contact with the front face 10F of the second layer 10.

As shown in the figures, the second layer 10 may comprise a first sublayer 10A made of polyamide and a second sublayer 10B made of polyamide and disposed downstream the first sublayer. The second sublayer 10B has for example a thickness comprised between 0.5 mm and 5 mm, preferentially comprised between 1 mm and 4 mm, most preferably between 1.4 mm and 4 mm or even between 1.5 mm and 3 mm.

One of said first 10A or second 10B sublayers, in particular the first sublayer 10A is tinted by addition of a pigment or a colorant, whereas the other sublayer, in particular sublayer 10B which is to be closest to the eye of the user, is a non-tinted crystal sublayer. In this case, the pigment or colorant is chosen to filter out part of the incident light spectrum. Alternatively, the second layer does not comprise two sublayers and is either fully crystal clear or fully tinted.

This arrangement is interesting in case where for example the third layer 15 is only a polarizing layer and first sublayer 10A is then configured as a filter layer, for example to filter a specific wavelengths or wavelength ranges or according to a prescribed spectrum in order to fulfill the requirement of a standard, for example international standard ISO 12312 concerning eye protection and in particular sunglasses.

In this case the rear face 10R of the second layer 10 may be surface finished for a corrective optical effect.

As to a further, simpler alternative illustrated in FIG. 3, the ophthalmic article 1 may not comprise either of the second layer 10 and the optional third layer 15. The ophthalmic article 1 of said alternative is thus comprised mainly of a first layer 9A.

The substrate 9A has a for example a thickness comprised between 0.5 mm and 5 mm, preferentially comprised between 1 mm and 4 mm, most preferably between 1.4 mm and 4 mm or even between 1.5 mm and 3 mm.

The disclosure described in relation to layer 9, second layer 10 or second sublayer 10B may apply mutatis mutandis to substrate 9A. In this embodiment the ophthalmic article is in particular a plano lens, i.e. a lens considered without optical power. In another embodiment, the rear face 9R of the substrate 9A may be surface finished for a corrective effect.

The substrate 9A is for example made of a plastic material, thermoset or thermoplastic plastic material, in particular made of polyamide (PA), like nylon or a polycarbonate. Substrate 9A may be crystal clear, tinted or partially tinted.

In this context, treatments conferring additional function may also be applied.

Turning to FIG. 4 showing an example of an embodiment of a method for decorating at least partially ophthalmic article 1.

In a step 302, an ophthalmic article 1 as shown in FIG. 5 is provided having a substrate (first layer 9) with its first outer surface 9F intended to be oriented towards the field of view 5 of a user.

The ophthalmic article 1 of FIG. 5 differs from FIGS. 1 and 2 by the fact that the outer surface, front face 9F, presents at least one decoration zone 30 distant of at least 15 mm, in particular 20 mm from center axis 32 of the ophthalmic article 1 which, in FIG. 7, is marked by an "X".

In general, the zones to be decorated are located outside the central vision zone 35 of the ophthalmic article 1. The central vison zone is defined as a circular or elliptic zone of about 15 mm, or even 20 mm around the center axis 32 of the ophthalmic article 1. Alternatively the decoration zone is distant of at least 15 mm or even 20 mm from the position of the eye corresponding to a mid-pupillary eye position of the user when the ophthalmic article is mounted in eyeglasses which are then worn by the user. Indeed, in most cases, the ophthalmic lenses are mounted in eyeglasses frame such that the optical center of the lens is to be in front of the mid-pupillary eye position of the user when the eyeglasses are worn by the user"

As shown in FIG. 5, the front face 9F has topographic structures 40. The topographic structures 40 can be considered as "voluntary surface defects" that have been created on the ophthalmic article 1, for example the ophthalmic articles described in relationship with FIGS. 1-3. At least one dimension of length "L" of the topographic structures 40, taken as such and not as a whole, is greater or equal to 1 mm on the first outer surface 9F for forming a decorative pattern. This means there is at least one "voluntary surface defect" that is part of the topographic structures 40 that has at least one dimension of length which greater or equal to 1 mm.

In the present example, the topographic structures 40 comprise ribs 42 and grooves 44 which are alternating in cross section. However, it is possible that the front face 9F of ophthalmic article 1 shows only ribs, or only grooves, or other combinations of patterns with for example a base pattern repeating itself in the decoration zone 30. The ribs 42 and grooves 44 have at least a length of 1 mm.

FIGS. 5-1, 5-2, 5-3 and 5-4 show examples of topographic structures 40, in particular an ellipse (FIG. 5-1), a star (FIG. 5-2), a rectangle (FIG. 5-3) and a curved line (FIG. 5-4) with one length dimension L.

As shown in FIG. 5-5, the width w of such ribs 42 or grooves 44 may comprised in a range of 10-400 µm, more specifically between 50-200 µm.

In case, the topographic structures 40 are for example upstanding or incrusted pyramids or cabochons, the length dimension L as well as the width dimension w is determined with respect to the extension/footprint on front face 9F.

The topographic structures 40 comprise for example at least one geometric form out of the following group: straight lines, curved lines, pyramids, needles.

The height h/depth d variation profile as shown in FIG. 5-5 with respect to the mean first outer surface, front face 9F, is greater than 20 µm and less than 200 µm, in particular less than 100 µm.

The topographic structures 40 comprise for example at least one periodic pattern, repeating itself on front face 9F at least several times.

The topographic structures 40 on front face 9F of the ophthalmic article 1 can be realized by different techniques for example implying mechanical, optical, chemical or molding techniques. The starting point may be an ophthalmic article as described in relationship with FIGS. 1-3.

One possible technique consists to engrave the topographic structures 40 mechanically with a tool or optically with a laser on the front face 9F of a polished ophthalmic article 1, in particular as described in relationship to FIGS. 1 to 3.

Another technique may imply 3-D printing techniques, for example with a 3-D printer, in order to deposit a rib 42 made in particular of the same material as the material of the layer 9 on the front face 9F of a polished ophthalmic article 1, in particular as described in relationship to FIGS. 1 to 3.

In other cases, the technique may consist in depositing on the front face 9F of a polished ophthalmic article 1, in particular as described in relationship to FIGS. 1 to 3, a heated metal wire or grid in zone 30 to be decorated, in particular of a noble metal like silver or gold, which locally will melt or soften the plastic material of layer 9 and creates as consequence the voluntary surface defects. One possibility is to withdraw the heated metal wire. This technique would be similar to a hot embossing technique. Another possibility is that the metal wire will stay embedded on the front face 9 and will contribute to fancy reflection effects on the finished ophthalmic article.

Quite another technique which is also well suited for high volume manufacturing is illustrated in FIG. 8 showing an injection molding installation 60 or injection mold comprising a concave mold 62 and a convex mold 64.

The molds 62 and 64 are made of polished metal, for example.

The concave mold 62 has been prepared and comprises in a zone 66 corresponding to the zone 30 to be decorated, the negative pattern 68 of the topographic structure 40, for example grooves for forming ribs or ribs for forming grooves.

Thus prior to step 302, in an optional step 300, the method may comprise a step of injection molding the ophthalmic article 1 in a molding installation 60.

The mold part, in this case the concave mold 62, which is configured to form the first outer surface (front face 9F), comprises in negative the topographic structures 40 forming a decorative pattern appearing positive on the first outer surface, the front face 9F.

According to one embodiment, the mold part 62 is an interchangeable mold insert presenting in negative the topographic structures forming a decorative pattern appearing positive on the first outer surface, the front face 9F.

Returning to FIG. 4, after step 302, the method comprises a step 304 for depositing on said first outer surface, front face 9F, thin layers 50 as shown in FIG. 6. These thin layers 50 have a refractive index different from the refractive index of the substrate (layer 9) to form an interferometric mirror 62 on top of the first outer surface, front face 9F. The interferometric mirror is in particular designed to reflect light in the visible domain, in particular between 450 nm-680 nm.

The thin layers 50 forming the interferometric mirror 62 are for example deposited by PVD or CVD. The interferometric mirror 62 comprises in particular between two and six thin layers 50.

The thin layers 50 may comprise for example alternating layers of SiO2 and Ti2O3, SiO2 layers having for example a thickness of 70-250 nm and Ti2O3 layers having for example a thickness of 40-80 nm. Other materials known to the person skilled in the art may be used in place, such as ITO, Ta2O5, ZrO2, Ti3O5. Typically, the thickness of an interferometric mirror 62 is less than 1 µm, for example less than 0.5 µm.

The thin layers 50 which are deposited will conform to the shape of the topographic structures 40. Thus, at the level of a rib 42, the layers 50 will also form longitudinal protrusions 54 of similar form of the rib 42 and at the level of a groove 42, the layers 50 will also form longitudinal valleys 56 of similar form of the groove 42.

This will modify the optical transfer function of the interferometric mirror 52 in the decoration zone 30 with regard to a smooth polished surface without these voluntary defects. The topographic structure 40 is thus to some extent replicated by the thin layers 50 and results an interferometric decorative pattern in the decoration zone 30.

In general, the topographic structures 40 have a height h/depth d variation profile with respect to the mean first outer surface, front face 9F which is greater than a total thickness of the interferometric mirror 62 (the stack of all thin layers 50). This means that the height h, the depth d or the sum of both (d+h) is greater than the total thickness of the interferometric mirror 62.

FIG. 7 shows a top view of an example of a decorated ophthalmic article 1, for example as sunglass, with its decoration zone 30 which is located outside the central vision zone 35 of the ophthalmic article 1, in particular above central vision zone 35 of the user.

In this case, the topographic structures 40 were formed as ribs 42 or grooves 42 organized as a grid pattern.

FIGS. 9 and 10 show another example of a decorated ophthalmic article 1, for example as sunglass, with its decoration zone 30 formed like a band shape, which is located outside the central vision zone 35 of the ophthalmic article 1, in particular above the central vision zone 35 of the user.

In this case, as the topographic structures 40 were formed as ribs 42 or grooves 42 organized as a honeycomb.

FIG. 11 shows quite another example of a decorated ophthalmic article 1.

In this case, the topographic structures 40 were formed as ribs 42 or grooves 42 organized as a double diamond pattern, with a first meta-pattern of straight lines formed by grooves or ribs forming first diamond topographic structures 40 and with second smaller diamond pattern turned by 90°, similar to a leaf, inside of each meta-pattern.

Consequently the method described here above offers a very large spectrum of possibilities for decoration at contained cost and is easy to manufacture on an industrial level.

The invention claimed is:

1. A method for decorating an ophthalmic article, the method comprising:
   (a) providing an ophthalmic article having a substrate with a first outer surface intended to be oriented towards a field of view of a user, wherein the first outer surface has at least one decoration zone outside a central vision zone of the ophthalmic article and has in said at least one decoration zone topographic structures of at least one dimension of length greater than or equal to 1 mm for forming a decorative pattern, and
   (b) depositing on said first outer surface thin layers having a refractive index different from the refractive index of the substrate to form an interferometric mirror on top of the first outer surface,
   wherein the topographic structures have a height/depth variation profile with respect to a mean first outer surface which is greater than a total thickness of the interferometric mirror.

2. The method according to claim 1, wherein the topographic structures comprise ribs and/or grooves.

3. The method according to claim 1, where the topographic structures comprise at least one geometric form selected from the group consisting of a straight line, a curved line, a pyramid, and a needle.

4. The method according to claim 1, wherein the topographic structures have a height/depth variation profile with respect to the mean first outer surface which is greater than 20 pm and less than 200 pm.

5. The method according to claim 1, wherein the topographic structures comprise at least one periodic pattern.

6. The method according to claim 1, wherein
   said providing (a) comprises injection molding the ophthalmic article in a mold, and
   a mold part configured to form the first outer surface comprises in negative the topographic structures forming the decorative pattern appearing positive on the first outer surface.

7. The method according to claim 6, wherein the mold part configured to form the first outer surface comprises an interchangeable mold insert presenting in negative the topographic structures forming the decorative pattern appearing positive on the first outer surface.

8. The method according to claim 1, wherein said providing (a) comprises at least one of the following:
   engraving the topographic structures,
   depositing a rib through 3-D printing on the first outer surface of a polished ophthalmic article, and
   depositing on the first outer surface of a polished ophthalmic article a heated metal wire or grid in the at least one decoration zone.

9. The method according to claim 1, wherein the thin layers forming the interferometric mirror are deposited by PVD or CVD.

10. The method according to claim 1, wherein the ophthalmic article further comprises a polarizing layer.

11. A decorated ophthalmic article manufactured by the method according to claim 1.

12. The decorated ophthalmic article according to claim 11, comprising a polarization layer.

13. The decorated ophthalmic article according to claim 11, wherein the ophthalmic article is an injection molded ophthalmic article and further comprises a layer of tinted plastic material.

14. A pair of sunglasses, comprising the decorated ophthalmic article according to claim 11, wherein the decoration zone is located above the central vision zone.

* * * * *